Dec. 10, 1957  E. E. WALLACE  2,815,970
MULTIPLE SHAFT SEAL
Filed Feb. 2, 1955

INVENTOR:
EUGENE E. WALLACE
BY Gravely, Lieder, Woodruff & Wills
ATTORNEYS.

United States Patent Office 2,815,970
Patented Dec. 10, 1957

2,815,970

MULTIPLE SHAFT SEAL

Eugene E. Wallace, Kirkwood, Mo., assignor to Wagner Electric Corporation, St. Louis, Mo., a corporation of Delaware Application February 2, 1955, Serial No. 485,693

6 Claims. (Cl. 286—26)

This invention relates to seals and is particularly directed to a multiple seal for a reciprocating shaft.

The life of any seal is determined by many factors, but principally by the pressure exerted by its sealing face against the relatively moving part to be sealed and by the amount of lubrication therebetween. A seal operating under high fluid pressures without lubrication on its sealing edges has a short life expectancy inasmuch as such a seal wipes a dry surface and the resulting generated heat soon causes its rupture. In a multiple sealing structure having a high unit pressure exerted upon the primary seal, no provision being made to lubricate its sealing surfaces, the sealing structure consists of a mere aggregation of cups or seals and failure of the structure is inevitable inasmuch as each cup will take the full pressure as the preceding cup is ruptured.

It is, therefore, an object of the present invention to provide a multiple seal wherein provision is made to lubricate the sealing surface of the primary seal.

Another object of this invention is to provide a multiple shaft seal capable of operating under excessive pressures with a minimum of wear on the sealing cups.

Another object is to provide a primary seal having lubricated sealing lips and operating under high fluid pressures, and a secondary seal operating under a relatively low fluid pressure.

These and other objects and advantages will become apparent hereinafter.

The invention is embodied in a multiple seal having a primary cup positioned between a housing wall and relatively movable shaft having a groove therein, and a secondary cup spaced from the primary cup and positioned between the housing and the shaft, the primary cup being subjected to high fluid pressures on one side and the groove in the shaft permitting limited flow of fluid past the primary cup to one side of the secondary cup.

Figure 1:
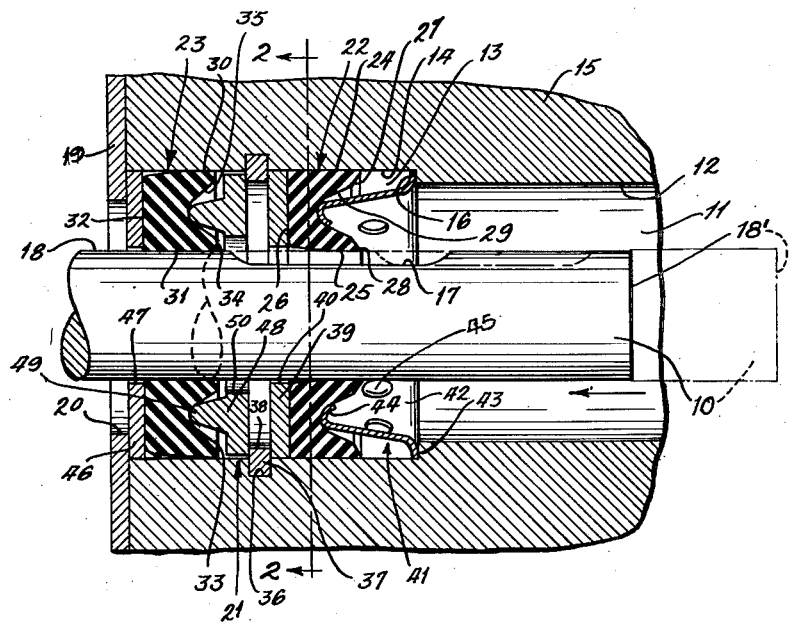
Figure 2:
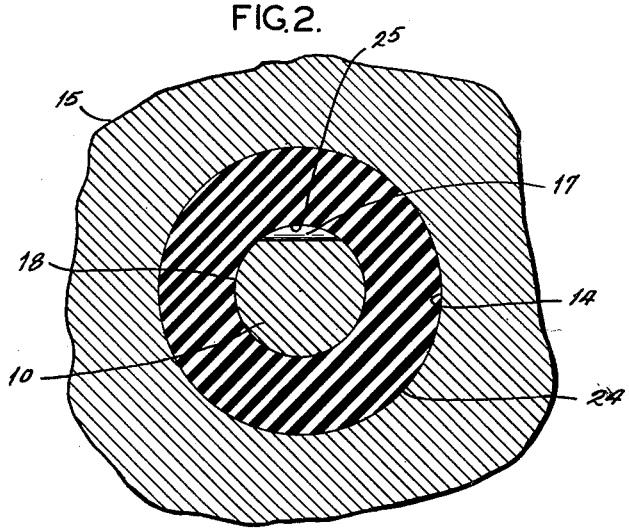

The invention also consists in the parts and in the arrangements and combinations of parts hereinafter described and claimed. In the accompanying drawing which forms a part of this specification and wherein like numerals refer to like parts wherever they occur:

Fig. 1 is a vertical sectional view of a multiple seal for a reciprocating shaft in inoperative position and showing the shaft in operative position in broken lines, and Fig. 2 is a cross-sectional view taken substantially along line 2—2 of Fig. 1.

For the purposes of disclosure, the embodiment of the invention illustrated is applied to a cylindrical shaft 10 adapted to reciprocate in a bore 11 defined by an inner wall 12 and a counterbore 13 defined by an inner wall 14, the bore 11 and the counterbore 13 being formed in a housing 15. A radial wall or shoulder 16 is formed between the inner walls 12 and 14 of the bore and counterbore 11 and 13, respectively. The shaft 10 is axially aligned with the bore 11 and the counterbore 13 and has a longitudinal passageway or groove 17 formed on its outer surface 18, the right end 18' of the shaft 10 being positioned in the bore 11.

The counterbore 13 is enclosed at its left end by a circular closing or stop plate 19, which is secured to the housing 15 and has a central opening 20 to permit unrestricted reciprocation of the shaft 10.

A multiple sealing arrangement 21 including an annular primary sealing cup 22 and an annular secondary sealing cup 23 is positioned in the counterbore 13 between its wall 14 and the shaft 10 so that fluid pressure developed in the bore 11 by the movement of the shaft 10 to the right will effectively be maintained in the bore 11, as will become apparent hereinafter. The primary sealing cup 22 has an annular outer surface 24 positioned adjacent to the wall 14 of the counterbore 13 and an annular inner surface 25 positioned adjacent to the outer surface 18 of the shaft 10. A radially extending wall or abutment surface 26 is formed on the side of the primary cup 22 away from the bore 11, and the side of the primary cup 22 that is adjacent to the bore 11 is formed into a concave shape having an outer sealing lip 27 adjacent to the wall 14 of the counterbore 13 and an inner sealing lip 28 adjacent to the shaft 10 with an annular depression 29 formed between the lips 27 and 28. The secondary cup 23 is similar to the primary cup 22, and has an annular outer surface 30, an annular inner surface 31, a radial abutment surface 32, an outer lip 33, an inner lip 34, and an annular depression 35, all of said portions of the secondary cup 23 being positioned relative to the counterbore 13 and shaft 10 in substantially the same relation as the similar parts of the primary cup 22.

The multiple sealing arrangement 21 further comprises a plurality of elements which maintain the primary and secondary sealing cups 22 and 23 in axial spaced relationship within the counterbore 13. A snap ring groove 36 is formed in the wall 14 of the counterbore 13 intermediate the radial wall 16 and the stop plate 19, and a snap ring 37 having a central opening 38 is positioned therein to provide a radial projection having abutment surfaces within the counterbore 13. The primary cup 22 is positioned to the right of the snap ring 37 and the secondary sealing cup 23 is positioned to the left thereof.

An annular retaining washer 39 having a circular central opening 40 is positioned to the right of the snap ring 37 and in abutting relation therewith. The radial abutment surface 26 of the primary cup 22 is positioned against the retaining washer 39 and is so maintained by an annular cup retainer 41 spacing the primary cup 22 from the radial shoulder 16. The cup retainer 41 has a substantially frusto-conically shaped body 42 having an annular radial base or flange 43 in engagement with the radial shoulder 16. The body 42 extends axially inwardly from the shoulder 16 and has an inturned end rim 44 abutting the depression 29 between the lips 27 and 28 of the primary cup 22. A plurality of spaced openings 45 are formed about the periphery of the body 42 of the cup retainer 41 to permit an unrestricted flow of fluid to the outer sealing lip 27.

An annular retaining washer 46 having a circular central opening 47 is positioned between the closing plate 19 and the abutment surface 32 of the secondary cup 23 and in abutting relationship therewith. The secondary cup is maintained against the retainer washer 46 by a rigid cup retainer or spreader 48 having an annular projection 49 disposed in the depression 35 between the lips 33 and 34 of the secondary cup 23. The cup spreader 48 has a central opening 50 for receiving the shaft 10 therethrough and the right side of the cup spreader 48 is abutted against the snap ring 37. It is now apparent that the primary sealing cup 22 is maintained in fixed spaced relation to the secondary sealing cup 23 and that each of the cups 22 and 23 has sealing lips engaging the wall 14 of the counterbore 13 and the shaft 10.

The portion of the counterbore 13 and bore 11 to the right of the primary cup 22 comprises a primary or high pressure chamber in which high fluid pressures are developed as the end 18' of the shaft 10 is moved to the right in the bore 11. The portion of the counterbore 13 to the left of the primary cup 22 comprises a secondary or low pressure chamber. The shaft 10 is positioned to the left in inoperative condition so that the groove 17 extends from the primary chamber past the primary cup 22 to the secondary chamber. However, when in inoperative condition, there is no appreciable fluid pressure in either of the chambers but the outer sealing lips 27 and 33 of the sealing cups 22 and 23 maintain a static sealing engagement with the wall 14 of the counterbore 13 and the inner sealing lip 34 of the secondary cup 23 maintains a static sealing engagement with the shaft 10. A non-sealing area is formed between the groove 17 in the shaft 10 and the inner sealing lip 28 of the primary cup 22.

When the shaft 10 is moved to the right (as shown by the broken lines) to develop fluid pressure in the primary chamber, the pressure is exerted against the primary cup 22 in the direction of the arrow in Fig. 1. During initial movement of the shaft 10 the fluid pressure is initially transmitted through the groove 17 into the secondary chamber and is exerted against the secondary sealing cup 23. This low or slight pressure assures the sealing engagement of the sealing lips 33 and 34 with the wall 14 of the counterbore 13 and the shaft 10 respectively. Furthermore, the fluid in the secondary chamber is carried by the outer surface 18 of the shaft 10 rightwardly into contact with the inner surface 25 of the primary sealing cup 22 thereby lubricating the inner surface 25. After the shaft 10 has moved to the right a predetermined distance, the groove 17 will pass through the primary seal 22 whereby the low pressure will be sealed in the secondary chamber. However, continued rightward movement of the shaft 10 will cause an additional fluid pressure to develop in the primary chamber to effect sufficient pressure for a braking application or the like. The higher pressure thus developed in the primary chamber will cause the sealing surfaces of the primary cup 22 to be moved into closer sealing engagement with the shaft 10 and counterbore wall 14 thereby causing the primary cup 22 to be slightly deformed. It should be noted that only a limited portion of the outer surface 30 of the secondary cup 23 is engaged on the wall 14 of the counterbore 13. Accordingly, the fluid forced into the secondary chamber by the deformation of the primary cup 22 will cause the secondary cup to be deformed thereby maintaining the pressure in the secondary chamber at a predetermined low value.

It is now apparent that the pressure in the secondary chamber will be relatively low because of the short distance the shaft 10 must move before the passageway 17 is sealed by the primary cup 22. It is also apparent that high pressures exerted against the primary seal 22 will not effect its failure inasmuch as the fluid carrying surface 18 of the shaft 10 lubricates the seal 22 whereby friction therebetween is kept at a minimum. Although the secondary seal 23 wipes a dry surface on the shaft 10, the wear on the seal 23 will be negligible because the pressure exerted against the seal 23 is small enough to prevent extreme frictional engagement between the sealing lip 34 and the shaft 10.

This invention is intended to cover all changes and modifications of the example of the invention herein chosen for the purposes of the disclosure, which do not constitute departures from the spirit and scope of the invention.

What I claim is:

1. In combination, a housing having a bore therein, a shaft adapted to move in said bore between a withdrawn position and a pressure developing position, and a multiple shaft seal comprising primary sealing means positioned in said bore between said shaft and said housing, secondary sealing means spaced from said primary sealing means between said shaft and said housing forming a chamber between said primary sealing means and said secondary sealing means, and passage means formed in said shaft to provide communication between said chamber and said bore when said shaft is in withdrawn position and movable out of communication with said chamber when said shaft is moved into pressure developing position.

2. In a construction having a reciprocating shaft positioned in an opening in a housing, a multiple shaft seal comprising primary sealing means extending between said housing and said shaft, secondary sealing means spaced from one side of said primary sealing means and extending between said shaft and said housing thereby forming a low pressure chamber, retaining means for positioning said sealing means relative to said housing, said opening on the other side of said primary sealing means forming a high pressure chamber, and passage means in said shaft extending between said high pressure chamber and said low pressure chamber when the shaft is in withdrawn position and movable out of communication with the latter when said shaft is moved further into said high pressure chamber.

3. In combination, a housing having a bore therein, a shaft adapted to reciprocate in said bore between an inoperative position and a pressure developing position, a multiple shaft seal comprising a pair of resilient annular cups positioned in said bore and spaced apart to form a low pressure chamber therebetween, each of said cups having an outer sealing lip in fixed sealing relationship with said housing and an inner sealing lip in slidable sealing relationship with said shaft, and a longitudinal passageway formed in said shaft extending from said low pressure chamber to said bore when said shaft is in inoperative position and movable with said shaft out of communication with said low pressure chamber when said shaft is moved into pressure developing position.

4. A multiple shaft seal comprising a primary cup fixedly positioned in a cylindrical opening in a housing, a secondary cup positioned in said opening in fixed spaced relationship with said primary cup, said primary and secondary cups having a central aperture formed therein for receiving a cylindrical shaft, the opening on one side of said primary cup forming a primary chamber, the space between said primary cup and said secondary cup forming a secondary chamber, and a longitudinal passageway formed in said shaft in communication with said primary and secondary chambers, said shaft being axially movable relative to said multiple shaft seal whereby said passageway will be moved into and out of communication with said secondary chamber.

5. A housing having a bore and a counterbore therein with a radial wall therebetween, a shaft adapted to reciprocate in said bore and counterbore, abutment means in said housing adjacent to the end of the counterbore opposite to said radial wall, a multiple shaft seal comprising a primary sealing cup and a secondary sealing cup positioned in said counterbore, each of said sealing cups having outer and inner sealing lips adapted to sealably engage said housing and said shaft respectively, spacing means positioned between said primary and secondary sealing cups for maintaining said cups in fixed spaced relation thereby forming a low pressure chamber, a cup retainer positioned between said primary sealing cup and said radial wall and spacing the former from the latter to define a high pressure chamber, said shaft having a longitudinal opening extending between said high and low pressure chambers when said shaft is in inoperative position and movable out of communication with said low pressure chamber after a predetermined movement of said shaft into operative position.

6. A housing having a bore and a counterbore therein with a radial wall therebetween, a shaft adapted to reciprocate in said bore and counterbore, a closing plate secured to said housing at the end of the counterbore opposite to the radial wall, said closing plate providing an abutment surface and a central opening for receiving said shaft, an annular snap ring secured to said housing intermediate said closing plate and said radial wall in said counterbore and providing a second abutment in said counterbore, said snap ring having a central opening for receiving said shaft therethrough, and a multiple shaft seal comprising a resilient primary sealing cup positioned in said counterbore intermediate said snap ring and said radial wall and having outer and inner sealing lips adapted to sealably engage said housing and said shaft respectively, a first annular washer having a central opening receiving said shaft therethrough, said first washer being positioned against said snap ring and having said primary sealing cup abutting thereagainst, said primary sealing cup being maintained in abutting relationship with said first washer by an annular cup retainer having opposed ends, one of said ends of the cup retainer being positioned against said primary sealing cup intermediate said sealing lips and the other end of said cup retainer being positioned against the radial wall, a resilient secondary sealing cup positioned in said counterbore intermediate said closing plate and said snap ring and having outer and inner sealing lips adapted to sealably engage said housing and said shaft respectively, a second annular washer having a central opening receiving said shaft therethrough, said second washer being positioned against said closing plate and having said secondary sealing cup abutting thereagainst, said secondary sealing cup being maintained in abutting relationship with said second washer by an annular cup spreader having a projection engaged on said secondary sealing cup intermediate its sealing lips, the side of said cup spreader opposite said projection abutting against said snap ring to fixedly space said secondary sealing cup from said primary sealing cup, said cup spreader having a central opening for receiving said shaft therethrough, said central openings of said cup spreader, snap ring and first washer defining a low pressure chamber, said counterbore and bore adjacent to said sealing lips of said primary sealing cup defining a high pressure chamber, said shaft having a longitudinal opening extending between said high and low pressure chambers when said shaft is in inoperative position and movable with said shaft out of communication with said low pressure chamber when said shaft is operative.

References Cited in the file of this patent

UNITED STATES PATENTS

| | | |
|---|---|---|
| 1,855,897 | Taylor | Apr. 26, 1932 |
| 1,868,668 | Mahon | July 26, 1932 |
| 1,996,780 | Wheeler | Apr. 9, 1935 |